United States Patent [19]

Mueller

[11] Patent Number: 5,484,654
[45] Date of Patent: Jan. 16, 1996

[54] PACKAGING MATERIAL AND METHOD OF MAKING A PACKAGING MATERIAL

[75] Inventor: Walter B. Mueller, Inman, S.C.

[73] Assignee: W.R. Grace & Co., Duncan, S.C.

[21] Appl. No.: 30,750

[22] Filed: Mar. 12, 1993

[51] Int. Cl.[6] ............................ B32B 1/08; B32B 27/08; B32B 31/00
[52] U.S. Cl. ............... 428/332; 156/272.6; 428/36.6; 428/335; 428/337; 428/500; 428/517; 428/518; 428/520; 428/913
[58] Field of Search .................. 428/500, 35.6, 428/35.9, 483, 516, 518, 517, 520, 523, 345, 35.7, 36.91, 913, 335, 337, 36.6, 332; 156/272.6

[56] References Cited

U.S. PATENT DOCUMENTS

| | | | |
|---|---|---|---|
| 4,642,239 | 2/1987 | Ferrar et al. | 426/396 |
| 4,769,262 | 10/1988 | Ferrar et al. | 428/35 |
| 4,788,105 | 11/1988 | Mueller et al. | 428/412 |
| 4,935,271 | 6/1990 | Schirmer | 428/35.2 |
| 5,034,281 | 7/1991 | Kawasaki et al. | 428/522 |
| 5,077,123 | 12/1991 | Shigemoto | 428/349 |
| 5,110,677 | 5/1992 | Barmure et al. | 428/349 |
| 5,208,094 | 5/1993 | Sun | 428/212 |
| 5,296,291 | 3/1994 | Mueller | 428/349 |

OTHER PUBLICATIONS

U.S. Polymethylpentene Modern Plastics/Oct. 1991, 74–75.

*Primary Examiner*—Paul J. Thibodeau
*Assistant Examiner*—Stephen Sand
*Attorney, Agent, or Firm*—Thomas C. Lagaly; Mark B. Quatt; William D. Lee

[57] ABSTRACT

A packaging laminate which includes a layer of polymethylpentene film and a sealant film. The films may be bonded by corona treatment. The laminate displays high oxygen transmission and heat resistance and may be used as a packaging material for produce such as cauliflower, broccoli and lettuce.

12 Claims, 1 Drawing Sheet

PACKAGING MATERIAL AND METHOD OF MAKING A PACKAGING MATERIAL

The present invention is directed to a packaging material and a method of producing the packaging material. The packaging material is a laminate of a polymethylpentene film and a sealant film wherein the films may be bonded by corona treatment.

BACKGROUND OF THE INVENTION

Many products are marketed in packages formed by wrapping a flexible transparent film around the product. Food products such as cauliflower, broccoli, and lettuce are typical of products benefited by this type of packaging since the flexible transparent film protects the product and provides for visual inspection of the product.

In the packaging of produce such as cauliflower, broccoli and lettuce it is also desirable to provide a packaging material with a high oxygen transmission, yet with low moisture transmission rates to resist a loss of moisture from the food product.

SUMMARY OF THE INVENTION

It is an object of the present invention to provide a packaging material and method of making the packaging material.

It is also an object of the present invention to provide a packaging material suitable for packaging produce such as cauliflower, broccoli, and lettuce.

It is another object of the present invention to provide a packing material which has high oxygen transmission and heat resistance.

Further, it is an object of the present invention to providing a method of producing a packaging material which comprises a laminate having a first layer of polymethylpentene film and a second layer of a sealant film, wherein the films are bonded by corona treatment.

A laminate in accordance with one aspect of the present invention comprises a first film containing a polymethylpentene polymer, and a second film containing, in order, a first layer of ethylene vinyl acetate copolymer, a second layer of ethylene vinyl acetate copolymer, a layer of a lower density alpha-olefin copolymer, and an outer layer of an alpha-olefin copolymer, wherein the rest layer of ethylene vinyl acetate copolymer is bonded directly to the polymethylpentene polymer by corona treatment.

A laminate in accordance with another aspect of the present invention comprises a first film containing a polymethylpentene polymer, and a second film containing, in order, a first layer of ethylene vinyl acetate copolymer, an intermediate adhesive layer, a layer of copolyester, a second intermediate adhesive layer, a layer of a lower density alpha-olefin copolymer, a second layer of ethylene vinyl acetate copolymer, a second layer of a lower density alpha-olefin copolymer, and an outer layer of an alpha-olefin copolymer, wherein said first layer of ethylene vinyl acetate copolymer is bonded directly to said polymethylpentene polymer by corona treatment.

BRIEF DESCRIPTION OF THE DRAWINGS

The invention can be further understood by reference to the following figures, wherein.

DETAILED DESCRIPTION OF THE INVENTION

In carrying out the objectives of the present invention, a packaging film and a method of producing a packaging film are described herein. The packaging film is a laminate which comprises a first layer of polymethylpentene film and a second layer of a sealant film, wherein the polymethylpentene film and the sealant film may be bonded by corona treatment.

Figure 1:
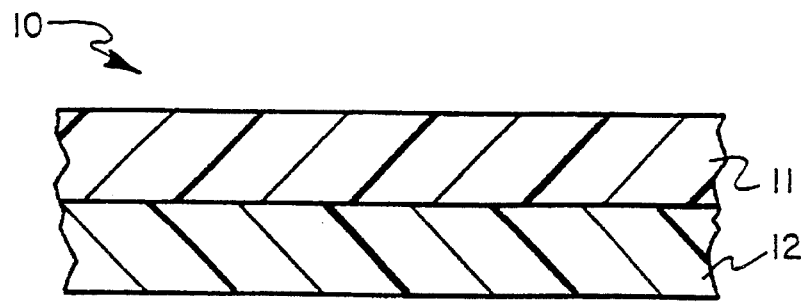
FIG. 1 is a schematic cross sectional view of a preferred embodiment of the laminated packaging material of the present invention.

In a preferred embodiment, FIG. 1 shows a two layer laminate 10 which includes a layer of polymethylpentene film 11 and a layer of a sealant film 12. The polymethylpentene film may be a composition of any of the various conventional homopolymers, copolymers, or blends of polymethylpentene.

The thickness of the polymethylpentene film may be in the range of 0.1–10 mils, with a preferred range of 0.5–2.0 mils.

The sealant film may be composed of any conventional sealant film compatible with the polymethylpentene film. The sealant film may be a single layer or multiple layers. In a preferred embodiment, the sealant film may comprise a material selected from the group consisting of an ethylene vinyl acetate copolymer, an alpha-olefin copolymer, a lower density alpha-olefin copolymer, an antiblocking agent, a tie layer, a copolyester and mixtures or layers of these. Monolayer and multilayer sealant films can be made by extrusion, coextrusion, lamination, and other techniques well known in the art.

EVA is a preferred material for a sealant layer of a multilayer sealant film 12. "Sealant layer" is used in this special context to denote a layer which is to be bonded to the polymethylpentene film 11, preferably by corona bonding. High vinyl acetate content EVA resins are especially preferred, i.e. VA content of more than 10% by weight of the EVA, more preferably 18% or more.

The term "ethylene vinyl acetate copolymer" as used herein for a type of polyethylene refers to a copolymer formed from ethylene and vinyl acetate monomers wherein the ethylene derived units in the copolymer are present in major amounts and the vinyl acetate derived units in the copolymer are present in relatively minor amounts. Ethylene vinyl acetate copolymer is known for its structural strength and for providing excellent adhesion to an adjacent layer.

The term "tie layer" as used herein refers to an adhesive layer between adjacent layers. Tie layers within the sealant film may be identical or different from each other, and may include a wide range of polymeric adhesives, preferably anhydride-grafted polyolefins including those based on an ethylene vinyl acetate copolymer, a polypropylene, or an alpha-olefin copolymer. Commercial examples of such materials are those marketed under the name Plexar available from QUANTUM/USI, the CXA series from DuPont, and the like.

The term "alpha-olefin copolymer" as defined herein refers to copolymers of ethylene (or propylene or butene) with one or more comonomers selected from $C_3$ to about $C_{10}$ alpha-olefins but especially comprises ethylene copolymers with $C_4$ to about $C_{10}$ alpha-olefins such as butene-1, pentene-1, hexene-1, octene-1, and the like in which the polymer molecules comprise long chains with few side chains or branches and sometimes are referred to as linear polymers. These polymers are typically obtained by low pressure polymerization processes. The side branching which is present will be short as compared to non-linear polyethylenes. The ethylene alpha-olefin polymer has a density in the range from about 0.910 g/cc to about 0.940 g/cc, more preferably in the range of from about 0.912 g/cc to about 0.928 g/cc for film making purposes. The melt flow index of these polyethylenes generally ranges from between about 0.1 to about 10 grams per ten minutes and preferably between from about 0.5 to about 3.0 grams per ten minutes (ASTM D 1238).

The "lower density alpha-olefin copolymers" as referred to herein, means ethylene alpha-olefin copolymers have a density from less than about 0.910 g/cc to about 0.860 g/cc, or even lower.

Some ethylene alpha-olefin copolymers are referred to as VLDPE or ULDPE; some lower density ethylene alpha-olefin copolymers are Tafmer(TM) made by Mitsui, and Exact(TM) resins made by Exxon.

In a preferred embodiment, the sealant film structure is a multi-layer composite having the generalized structure of A/B/C/B/D/E/D/F, where A is a sealant layer of about 80% EVA and about 20% antiblock, B is a tie layer, C is a copolyester, D is a lower density alpha-olefin copolymer, E is a layer of EVA, and F is an alpha-olefin copolymer.

In another preferred embodiment the sealant film structure is a multi-layer composite having the generalized structure of A/E/D/F, where A is a sealant layer about 80% EVA and about 20% antiblock, D is a lower density alpha-olefin copolymer, E is a layer of EVA, and F is an alpha-olefin copolymer.

The thickness of the sealant film may be in the range of 0.1–10 mils, with a preferred range of 0.5–2.0 mils.

In a preferred embodiment, the laminate is used as a packaging film. A preferred method of producing the packaging film comprises providing a first layer of polymethylpenetene film, providing a second layer of a sealant film, and bonding the polymethylpentene film to the sealant film by corona treatment.

Figure 2:
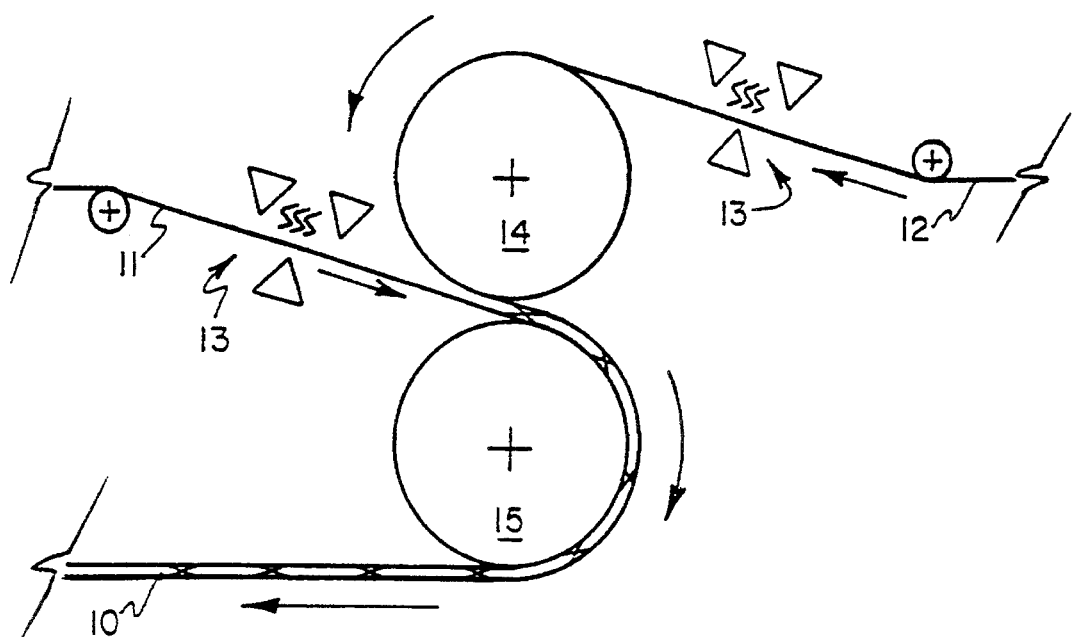
FIG. 2 is a schematic of a preferred embodiment of the process of producing the laminated packaging material of the present invention.

In a preferred embodiment, a method of producing the laminate is shown in FIG. 2. The bonding surfaces of the polymethylpentene film 11 and the sealant film 12 are each corona treated at 13. The two films are brought together for bonding between rubber roller 14 and heated nip roll 15. Rollers 14 and 15 may provide additional heat and pressure to enhance the bonding of layers 11 and 12. The product is a laminate 10.

Other bonding techniques may be used to bond the layers of the laminate including the use of conventional lamination adhesives. However, bonding techniques in which a separate adhesive is used may be less desirable where certain end uses, such as lettuce packaging, are combined with certain types of machinery for creating a finished package.

The laminate produced by the above process is suitable for many applications, including lid stock applications for packaging produce such as cauliflower, broccoli, and lettuce. In a preferred embodiment, the packaging film of the present invention is especially suitable for use in connection with Kartridg-Pak or other types of vertical form fill seal machinery.

The laminate produced by the above process exhibits high oxygen transfer and heat resistance. The oxygen transmission of the laminate of the present invention may be up to about 18,000 $cc/m^2$. The high heat resistance of an incorporated copolyester will help prevent burns through the sealant layer.

The beneficial high oxygen transmission rates associated with laminates of the present invention are demonstrated in Table 3, where several examples and $O_2$ transmission rates are identified. The commercial resins used in these examples are identified in Table 1; the laminate structures are identified in Table 2. In Table 1, "PMP" refers to polymethylpentene; "EVA 1" is an EVA with 25% by weight vinyl acetate (VA); "EVA 2" is an EVA with about 12% VA; "EVA 3" is an EVA with about 18% VA; "AB" is an antiblock concentrate with 90% low density polyethylene and 10% silica; "ADH" is a modified ethylene methyl acrylate polymeric adhesive; "CP" is a copolyester; "EOC" is an ethylene octene copolymer; and "PP" refers to polypropylene film.

TABLE 1

| MATERIAL | TRADENAME | SUPPLIER |
| --- | --- | --- |
| PMP 1 | TPX X-22 | Mitsui |
| PMP 2 | TPX DX 845 | Mitsui |
| EVA 1 | Elvax 3190 | DuPont |
| EVA 2 | Elvax PE 3508 | DuPont |
| EVA 3 | Elvax 3165 | DuPont |
| AB | EPE-8160 | Teknor Color |
| ADH | Plexar 3382 | Quantum/USI |
| CP | Ecdel 9967 | Eastman Chemical |
| EOC 1 | DEFD 1138 | Union Carbide |
| EOC 2 | Dowlex 2251 A | Dow |
| EOC 3 | DEFD 1137 | Union Carbide |
| EOC 4 | Dowlex 2035 | Dow |
| PP | PY 110 | W.R. Grace |

TABLE 2

| EXAMPLE | LAMINATE STRUCTURE |
| --- | --- |
| 1. | PMP 1//80% EVA 1 + 20% AB/ADH/CP/AD/ EOC1/EVA2/EOC1/EOC2<br>PMP 1 was cast, 1.25 mils thick film<br>Sealant film was 1.50 mils thick |
| 2. | PMP 2//80% EVA 1 + 20% AB/EVA 3/EOC3/ EOC4<br>PMP 2 was cast, 1.00 mils thick film<br>Sealant film was .75 mils thick |
| 3. | like Example 2; PMP was .75 mils thick |
| 4. | like Example 2; PMP 2 was .5 mils thick |
| 5. (comparative) | like Example 1, but with .60 mils thick PP film instead of PMP 1 film |

TABLE 3

| | OXYGEN TRANSMISSION |
| --- | --- |
| EXAMPLE | (in cubic centimeters at standard temperature and pressure, in 24 hours, per square meter) (ASTM D3985-81) (average of 3 samples) |
| 1. | 6813.9 |
| 2. | 12844.6 |
| 3. | 12689.5 |
| 4. | 16179.1 |
| 5. (comparative) | 3928.9 |

Although the present invention has been described by reference to the specific embodiments and examples, those skilled in the art would readily understand that modifications may be made by one skilled in the art after a review of this description without departing from the spirit and scope of the claims which follow.

What is claimed is:

1. A laminate, comprising:

a first film containing a polymethylpentene polymer; and a second film containing, in order, a first layer of ethylene vinyl acetate copolymer, a second layer of ethylene vinyl acetate copolymer, a layer of a lower density alpha-olefin copolymer, and an outer layer of an alpha-olefin copolymer, wherein said first layer of ethylene vinyl acetate copolymer is bonded directly to said polymethylpentene polymer by corona treatment.

2. A laminate according to claim 1, wherein the thickness of said first film is about 0.1 to 10 mils.

3. A laminate according to claim 2, wherein the thickness of said first film is about 0.5 to 2.0 mils.

4. A laminate according to claim 1, wherein the thickness of said second film is about 0.1 to 10 mils.

5. A laminate according to claim 4, wherein the thickness of said second film is about 0.5 to 2.0 mils.

6. A laminate according to claim 1, wherein said polymethylpentene is in a copolymer.

7. A laminate, comprising:

a first film containing a polymethylpentene polymer; and a second film containing, in order, a first layer of ethylene vinyl acetate copolymer, an intermediate adhesive layer, a layer of copolyester, a second intermediate adhesive layer, a layer of a lower density alpha-olefin copolymer, a second layer of ethylene vinyl acetate copolymer, a second layer of a lower density alpha-olefin copolymer, and an outer layer of an alpha-olefin copolymer, wherein said first layer of ethylene vinyl acetate copolymer is bonded directly to said polymethylpentene polymer by corona treatment.

8. A laminate according to claim 7 wherein the thickness of said first film is about 0.1 to 10 mils.

9. A laminate according to claim 8, wherein the thickness of said first film is about 0.5 to 2.0 mils.

10. A laminate according to claim 7, wherein the thickness of said second film is about 0.1 to 10 mils.

11. A laminate according to claim 10, wherein the thickness of said second film is about 0.5 to 2.0 mils.

12. A laminate according to claim 7, wherein said polymethylpentene is in a copolymer.

* * * * *